No. 787,901. Patented April 25, 1905.

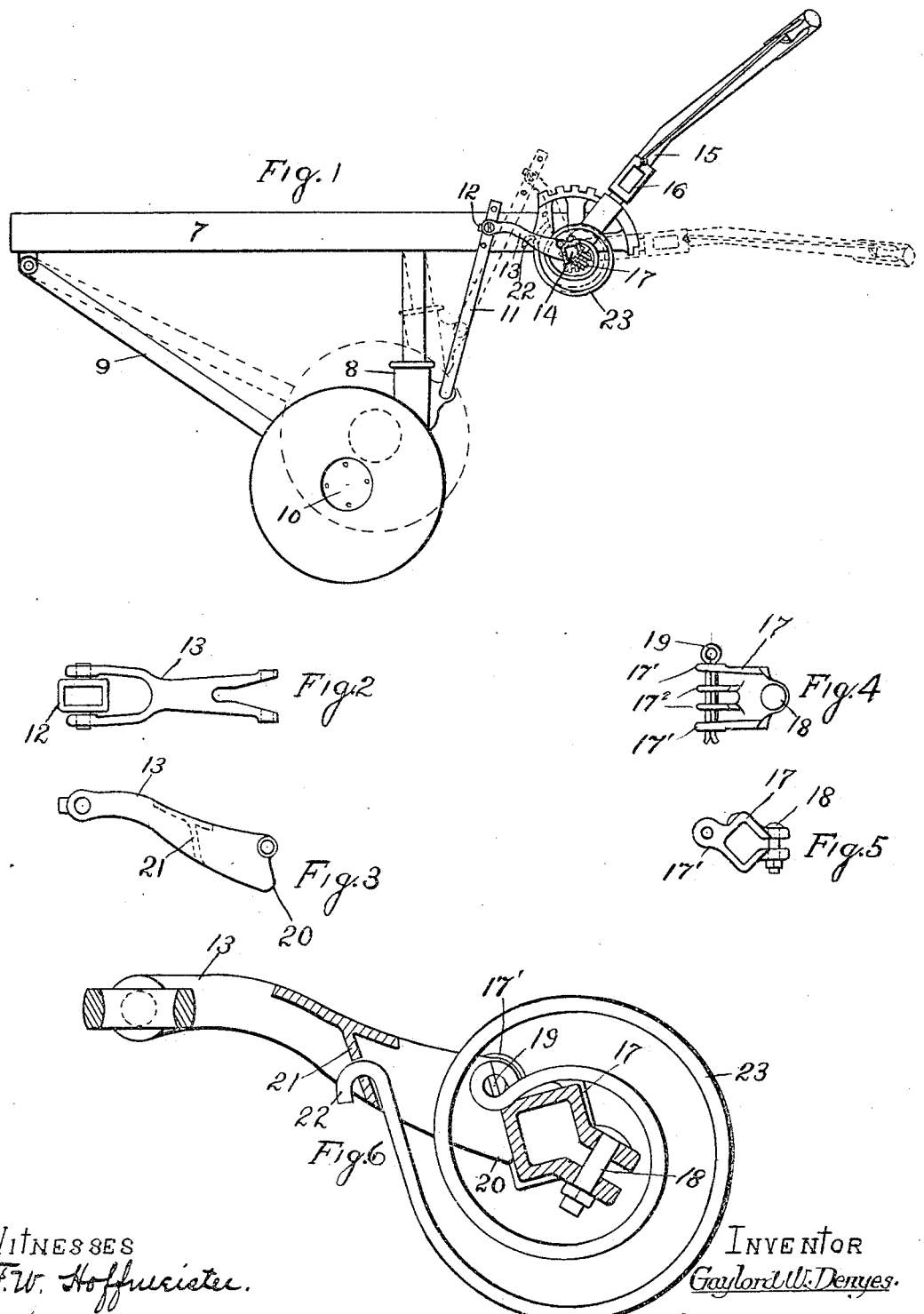

UNITED STATES PATENT OFFICE.

GAYLORD W. DENYES, OF CHICAGO, ILLINOIS, ASSIGNOR TO INTERNATIONAL HARVESTER COMPANY, A CORPORATION OF NEW JERSEY.

GRAIN-DRILL.

SPECIFICATION forming part of Letters Patent No. 787,901, dated April 25, 1905.

Application filed January 7, 1905. Serial No. 240,007.

*To all whom it may concern:*

Be it known that I, GAYLORD W. DENYES, a citizen of the United States, residing at Chicago, in the county of Cook and State of Illinois, have invented certain new and useful Improvements in Grain-Drills, of which the following is a specification, reference being had to the accompanying drawings, forming a part thereof.

My invention relates to improvements in grain-drills; and its object is to provide improved means for yieldingly forcing the hoes or disks into the soil when in action and for lifting the same clear of the ground when out of action and to provide the device with certain new and useful features hereinafter more fully described, and particularly pointed out in the claim.

My invention consists in providing the machine with an adjustable rock-shaft having an arm for each hoe and flexible mechanism connecting each arm to the respective hoe, whereby the hoes are yieldingly pressed into the soil or lifted free from the same, according as the rock-shaft is adjusted, and in certain other details of construction, as will more fully appear by reference to the accompanying drawings, in which—

Figure 1 is a side elevation of a device embodying my invention, and Figs. 2, 3, 4, 5, and 6 are details of the same.

The same reference-numerals denote like parts in the various figures.

7 represents a portion of the frame of the machine. 8 is the grain chute or tube. 9 is the drag-bar, extending forward and upward from the drill chute or tube and pivotally connected to the frame. 10 is the furrow-opening disk rotatably mounted upon the drill-chute, all as heretofore constructed.

A link 11 is pivoted at its lower end to the chute 8 and at its upper end is slidably connected with a sleeve 12, that is pivotally mounted between the forked ends of an arm 13 and is provided with a series of holes therein for the purpose of adjustment by the insertion of pins both above and below the sleeve.

A rock-shaft 14 is suitably mounted on the frame of the machine, and connected therewith is a suitable hand-lever 15, having the usual sliding detent 16 engaging with a common form of sector-rack mounted on the machine-frame. A series of lever-carrying clips 17 are clamped upon the rock-shaft by means of the bolts 18, said clips having forwardly-projecting ear portions 17' upon opposite ends thereof and intermediate ear portions $17^2$ parallel with the ears 17', and pivoted to each clip at its forward end is one of the arms 13. The arms are forked at their rear ends and provided with a transverse hole to receive a connecting-pin 19, that connects the forked ends of the arms with the ear portions 17'. The forked arms are also provided with downward-projecting heel portions 20, that will contact with the clip 17, and thus limit the downward swing of the arm 13 relative to the clips. Between the rear pivot of the arm 13 and its forked forward end there is a bridge 21, having an opening that receives the hook-shaped end 22 of a volute spring 23, the opposite end of the spring having an eye formed thereon that receives the connecting-pin 19 between the intermediate ears $17^2$. The two parts 13 and 17 are held in yielding relation by means of the spring, and the arm 13 is thereby caused to press elastically upon the furrow-opening devices through the connecting-links 11. When the hand-lever 15 is operated to raise the furrow-opening devices from the ground, the heel portions 20 coming in contact with the clips 17 make a rigid lever of the two parts that will operate to lift the said furrow-opening devices by means of the links 11. The amount of pressure of the springs upon the furrow-opening devices may be regulated by the hand-lever 15 in combination with the adjustment of the sleeves 12 along the links 11.

What I claim as my invention, and desire to secure by Letters Patent, is—

In a grain-drill, the combination of a vertically-movable furrow-opening device, a rock-shaft, a clip secured to said rock-shaft, said clip having forwardly-projecting parallel ears upon opposite ends thereof, intermediate ears between said parallel ears, an arm having two side bars connected near their central portion by a bridge-piece, said side bars being pivotally connected at their rear ends to said clips by means of a pin passing through said bar and said series of ears, said bars having a heel portion that contacts with said clips to limit their downward swing, a link pivotally connected with said furrow-opening device, a sleeve movable upon the upper end of said link, said sleeve pivotally connected upon opposite sides to the forward ends of the side bars of said arm, and a volute spring encircling said rock-shaft and having one end engaging with the bridge portion of said arm and its opposite end with the pivotal connection of the arm and clip between the said intermediate ears.

In witness whereof I hereto affix my signature in presence of two witnesses.

GAYLORD W. DENYES.

Witnesses:
 H. J. CARE,
 PETER GULDBRANDSEN.